Dec. 19, 1961 D. FRITSCH 3,013,338
MAGNETIC GAUGE
Filed Feb. 3, 1958 2 Sheets-Sheet 1
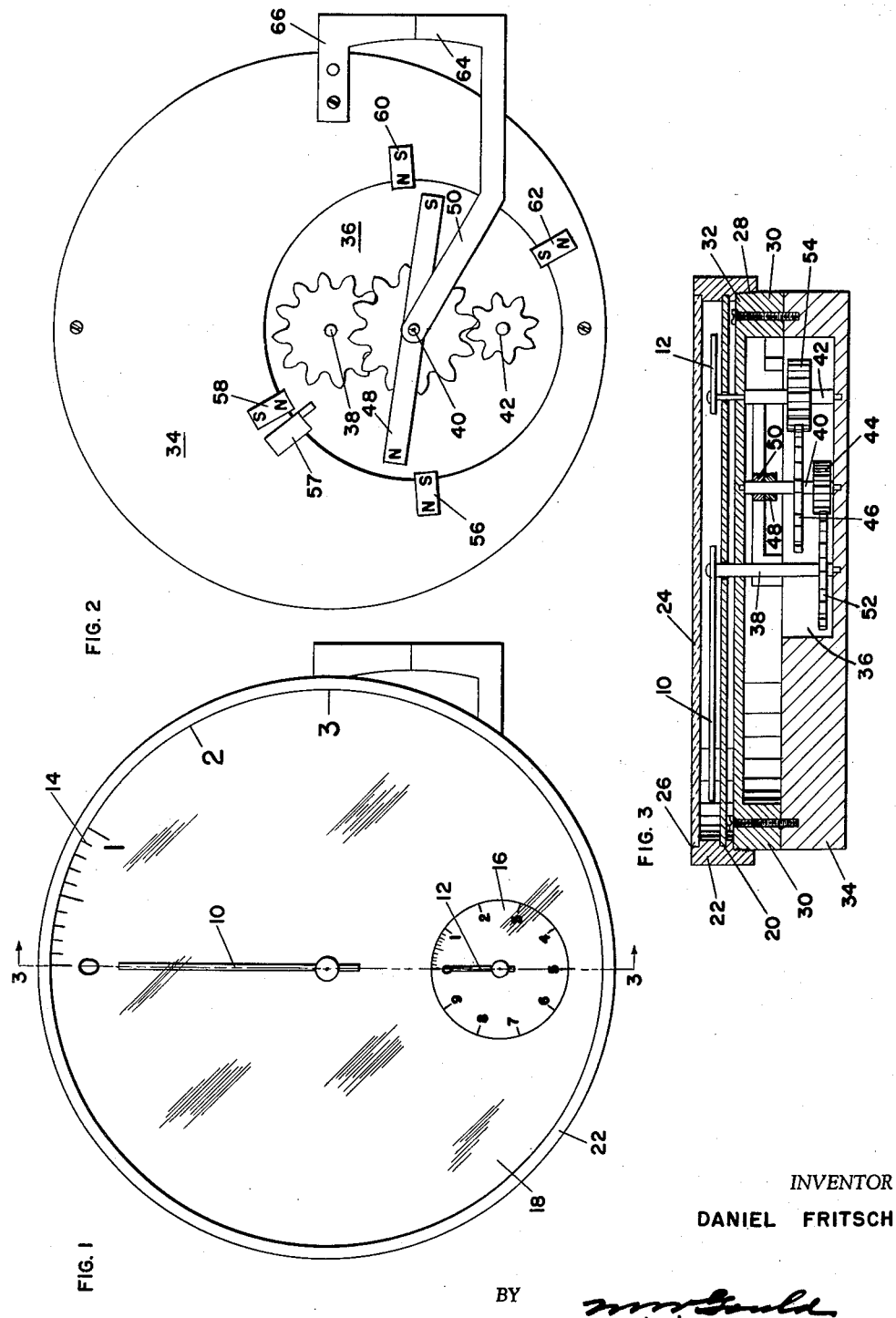
INVENTOR
DANIEL FRITSCH
BY
ATTORNEY Dec. 19, 1961  D. FRITSCH  3,013,338
MAGNETIC GAUGE
Filed Feb. 3, 1958  2 Sheets-Sheet 2

*INVENTOR*
DANIEL FRITSCH

BY

*ATTORNEY*

United States Patent Office 3,013,338
Patented Dec. 19, 1961

3,013,338
MAGNETIC GAUGE
Daniel Fritsch, Lancaster, Pa., assignor to Hamilton Watch Company, Lancaster, Pa., a corporation of Pennsylvania
Filed Feb. 3, 1958, Ser. No. 712,946
6 Claims. (Cl. 33—148)

This invention relates to gauges of the type having opposed anvils or jaws consisting of one stationary anvil and one movable anvil.

Heretofore in gauges having one stationary anvil and a movable anvil between which the workpiece to be measured is placed, the movable anvil is usually controlled through a spring, the anvil being moved to permit the work piece to be placed on the stationary anvil and then being returned to bear against the work piece by the action of a spring, the distance between the movable anvil and the stationary anvil being measured on a dial by means of a pointer connected through a gear train to the movable anvil.

In this type of gauge the spring supplies the return torque by which the movable anvil is brought in contact with the work piece and the magnitude of this return torque obviously is a function of the angular displacement of the spring. It will thus be seen that the anvil closing forces resulting from the return torque will depend upon the size of the work piece being measured. In certain measurements, particularly on easily deformed materials, variations in closing forces can result in erroneous measurements. Where the ultimate measurement or the indication on the dial by the pointer is through a train of gears, this unequal pressure can also result in a difference in the backlash or play among the gears and an erroneous reading at one end or the other of the extent of the measurement.

This invention, by eliminating any spring, tends to provide an equal torque on the object no matter whether the part being measured is small or large.

It is the object of the present invention to provide a gauge of the opposed contact type where one of the anvils is stationary and the other movable, the operation of the movable anvil being effected through the interaction of magnetic fields.

The invention is illustrated in the accompanying drawings in which:

FIGURE 1 is a top plan view of the gauge.

FIGURE 2 is a horizontal section showing the lower part of the gauge with the dial, hands and crystal removal.

FIGURE 3 is a cross-section on line 3—3 of FIGURE 1.

Figure 5:
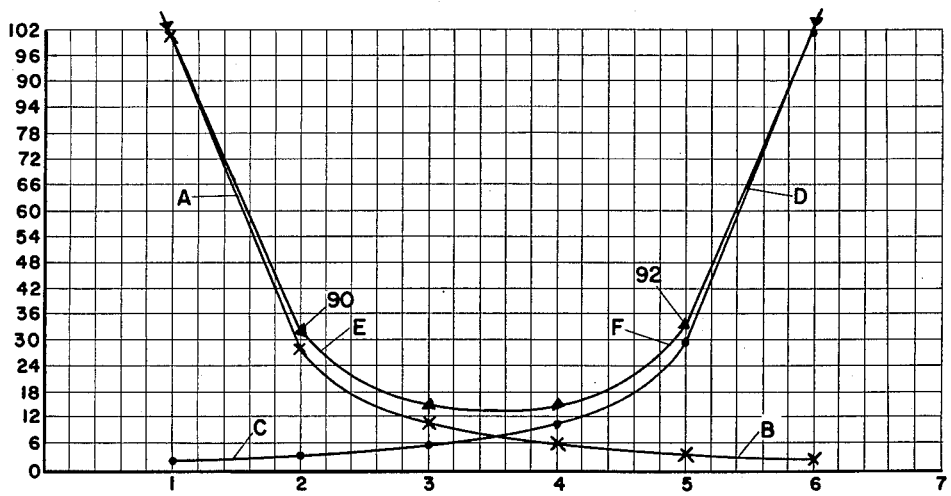
FIGURE 5 is a graph showing the torque acting on the movable anvil.

The gauge is formed with a hand 10 indicating revolutions of a second hand 12, one complete revolution of the hand 12 being shown up as one graduation on the scale marking 14, parts of revolutions of the hand 12 being shown on the scale 16. The two scales are engraved or printed on a dial 18 which is mounted in a groove 20 in a bezel 22. A crystal or glass plate 24 is also carried in the bezel in the groove 26 and forms a protective covering for the dial and hands. The bezel 22 is formed with threads 28 on its inner surface so that it may be threaded on the bridge 30. A shoulder 32 formed on the bezel ring and adapted to engage the edge of the bridge 30 forms a dirt and dust seal which normally excludes extraneous matter from the dial and hands, and provides a stop to limit the threading of the bezel, keeping the glass plate from contact with the hands.

A base plate 34 is formed with a circular well 36 in which is mounted a staff 38, a center staff 40 and a pinion staff 42. The staffs are journaled at one end in the base plate and at the other end in the bridge 30.

The center staff 40 carries a lower pinion 44, a central gear 46 and has keyed thereon a magnet 48 and a movable anvil arm 50. The staff 38 carries a lower gear 52 in mesh with pinion 44 and supports the indicating hand 10. The staff 42 carries a pinion 54 in mesh with gear 46 and supports the small hand 12. Carried on the base plate 34 are four bar magnets, 56, 58, 60 and 62 located at pre-determined positons around the central well 36 and having their ends projecting slightly into the well area.

Secured to the base plate 34 is a stationary anvil 66 which is substantially L shaped and is adapted to be contacted by the movable anvil 64, corresponding to the zero reading on the scales.

The gauge is used the same as other gauges with the magnet 48 and its companion magnets 56, 58, 60 and 62 serving in place of a spring. The advantage lies in the fact that the motion of the magnet 48 is limited to approximately 45 degrees by a stop 57 attached to the base plate and extending into the path of travel of the magnet 48.

Magnets are arranged about the well 36 in diametrically opposed pairs, 56 and 60, serving to attract the north and south poles respectively of the magnet 48 while magnets 58 and 62 are arranged to repel the north and south poles of the magnet 48. It will be seen that with the magnet 48 positioned so that the anvils are closed there is a maximum attraction exerted on the poles of the magnet 48 by the magnets 56 and 60. Also in the extreme open position there is a maximum repulsion exerted on the poles of the magnet 48 by the magnets 58 and 62. At any intermediate position the magnet 48 will be both attracted and repulsed by the magnets 56—60 and 58—62 respectively in proportion to the square of distance from either group. These forces are additive and produce a torque tending to rotate the magnet 48 and close the anvils 64—66. The angle through which the magnet 48 is permitted to rotate is limited in one direction by the contact of anvil 64 with the anvil 66 and in the other direction by contact with a stop 57 located adjacent the magnet 58. This produces a substantially uniform torque on the magnet 48 at all times and tends to produce an even pressure exerted upon the work between the movable anvil 64 and the stationary anvil 66. Due to wear and certain imperfections in manufacture there is bound to be a certain play between the teeth of the gears and pinions and when the torque on the magnet 48 is approximately the same with any position of the movable anvil the force exerted on the teeth of the gears and pinions will be approximately the same in every position. This is opposed to the disposition of the gear teeth where there is a spring used to return the movable anvil to position, because at that point of greatest tension in the spring there will be exerted greater pressure between the teeth of the gears and pinion with the result there could be a slight discrepancy in the reading.

Figure 4:
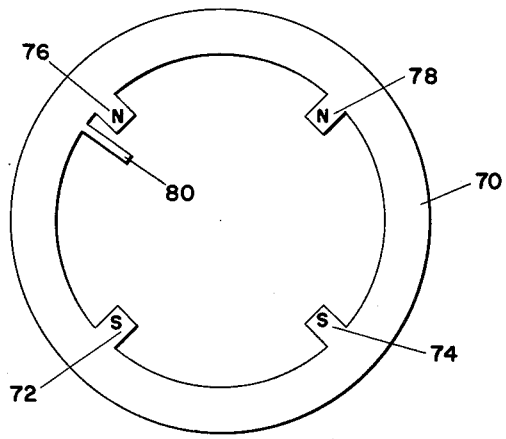
FIGURE 4 is a plan view of a modification of the magnets.

Referring to FIGURE 4 the magnets 56, 58, 60 and 62 are shown in a different form. A single circular magnet 70 is magnetized so that projections 72 and 74 are south poles and 76 and 78 are north poles. These projections serve the same function that the bar magnets 56, 58, 60 and 62, with the projections 72 and 78 working as one pair and the projections 74 and 76 working as the other pair. The advantage of the modification is the easier manner in which the magnet 70 may be inserted, bearing in mind that the gauge is a small gauge and the magnet 48 is approximately 1¼" long. A stop 80 set into the magnet 70 serves the function of the stop 57.

FIGURE 5 shows a graph representing the magnetic forces acting on the bar magnet 48. The curve AB represents the effect of the magnetic field of the magnet 56 on the magnet 48 during the movement of the magnet 48 away from the magnet 56. The curve CD shows the force exerted by the magnetic field of the magnet 58 on the magnet 48 as the magnet 48 approaches the magnet 58. Inasmuch as these two forces are additive on the magnet 48 they are put together to form the single curve EF. By means of the stop 57 and the closing of the anvils 64 and 66 the bar magnet 48 is prevented from approaching the magnets 56 or 58 closer than the unit 2, so that the effective force exerted on the magnet 48 extends as shown on the graph from the point 90 to the point 92 providing practically an even torque exerted on the magnet 48. In all gauges of this type there is a certain amount of play and wear between the gear teeth and by maintaining an even torque on the bar magnet 48 the effect of this play between the teeth of the gear is less noticeable than in gauges where the torque exerted ranges from a maximum to a minimum. Where the measurement is in the neighborhood of .00001″ the difference in a gauge of this type over that operated through the torque exerted by a coil spring is appreciable.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by the United States Letters Patent is:

1. A gauge comprising a stationary anvil, a movable anvil pivotally mounted for limited arcuate movement toward and away from said stationary anvil, means constantly indicating the distance between the anvils, a bar magnet pivotally mounted with the movable anvil and stationary magnets creating a magnetic field which will react with the bar magnet to urge the movable anvil into contact with the stationary anvil.

2. A gauge comprising a staionary anvil, a movable anvil pivotally mounted for limited arcuate movement toward and away from said stationary anvil, means indicating the distance between the anvils, a bar magnet pivotally mounted with the movable anvil, a pair of stationary magnets with the poles arranged to simultaneously attract and repel the pivoted bar magnet.

3. A gauge comprising a stationary anvil, a movable anvil pivotally mounted for limited arcuate movement toward and away from said stationary anvil, means indicating the distance between the anvils, a bar magnet pivotally mounted with the movable anvil, pairs of stationary magnets arranged adjacent the arcuate path of the bar magnet, each end of the bar magnet being simultaneously attracted and repelled by the stationary magnets, all of said magnets cooperating to produce a single torque.

4. A gauge according to claim 3 and including means for limiting the arcuate path of the bar magnet.

5. A gauge according to claim 4 wherein the limiting means maintains the bar magnet within limits which will provide a substantially uniform torque on the bar magnet in all positions.

6. A gauge comprising a stationary anvil, a movable anvil pivotally mounted for limited arcuate movement with respect to said stationary anvil from a closed position to a maximum open position, means constantly indicating the distance between said anvils, a bar magnet pivotally mounted with said movable anvil, first magnetic means creating a strong magnetic field of one sense for said bar magnet when said anvils are in their closed position, and second magnetic means creating a strong magnetic field of the opposite sense when said anvils are in their maximum open position.

References Cited in the file of this patent

UNITED STATES PATENTS

| 310,908 | Morrison et al. | Jan. 20, 1885 |
| 499,199 | Bath | June 13, 1893 |
| 824,064 | Callan | June 19, 1906 |
| 2,637,552 | Watson | May 5, 1953 |

FOREIGN PATENTS

| 732,515 | Germany | Mar. 4, 1943 |